(12) United States Patent
Pope et al.

(10) Patent No.: US 12,522,786 B2
(45) Date of Patent: Jan. 13, 2026

(54) ORGANIC COMPOUNDS

(71) Applicant: GIVAUDAN SA, Vernier (CH)

(72) Inventors: Alexander Spencer Pope, Ashford (GB); Anne-Sylvie Selezneff, Paris (FR); Philippe Blondeau, Paris (FR)

(73) Assignee: GIVAUDAN SA, Vernier (CH)

( * ) Notice: Subject to any disclaimer, the term of this patent is extended or adjusted under 35 U.S.C. 154(b) by 354 days.

(21) Appl. No.: 18/042,568

(22) PCT Filed: Jan. 22, 2021

(86) PCT No.: PCT/EP2021/051458
§ 371 (c)(1),
(2) Date: Feb. 22, 2023

(87) PCT Pub. No.: WO2022/058048
PCT Pub. Date: Mar. 24, 2022

(65) Prior Publication Data
US 2023/0365901 A1 Nov. 16, 2023

(30) Foreign Application Priority Data

Sep. 17, 2020 (GB) ..................................... 2014639

(51) Int. Cl.
*C11D 3/00* (2006.01)
*C11D 3/50* (2006.01)

(52) U.S. Cl.
CPC ............. *C11D 3/50* (2013.01); *C11D 2111/12* (2024.01)

(58) Field of Classification Search
None
See application file for complete search history.

(56) References Cited

U.S. PATENT DOCUMENTS

| 8,343,906 B2 * | 1/2013 | Bettiol ................ C11D 3/0084 510/237 |
| 9,885,009 B2 | 2/2018 | Brundel et al. |
| 2020/0056118 A1 | 2/2020 | Schulze et al. |

FOREIGN PATENT DOCUMENTS

| GB | 2534897 A1 | 8/2016 |
| WO | 2004009749 A1 | 1/2004 |
| WO | 2015165582 A1 | 11/2015 |
| WO | 2017012947 A1 | 1/2017 |
| WO | 2017046051 A1 | 3/2017 |
| WO | 2018029161 A1 | 2/2018 |
| WO | 2018050721 A1 | 3/2018 |
| WO | 2018071897 A1 | 4/2018 |
| WO | 2020089274 A1 | 5/2020 |

OTHER PUBLICATIONS

International Search Report and Written Opinion of the International Searching Authority for corresponding application PCT/EP2021/051458 dated Jun. 14, 2021.
Mueller, et al.; "The Measurement of Odors", Perfumes: Art, Science and Technology, Chapter 6 at pp. 176-179, Elsevier 1991.
Etzweiler, F., et al.; "Eine einfache Methode zur Bestimmung von Dampfdrucken", Ber. Bunsen-Ges. Phys. Chem. 1984, 88, 578-583.
GB Search Report for corresponding application GB 2014639.5 dared Feb. 26, 2021.

* cited by examiner

*Primary Examiner* — Necholus Ogden, Jr.
(74) *Attorney, Agent, or Firm* — Norris McLaughlin, PA

(57) ABSTRACT

The present invention relates to a fragrance accord, to a use of such a fragrance accord for enhancing the bloom linearity of a fragrance, and to a method for enhancing the bloom linearity of a fragrance composition.

10 Claims, No Drawings

ORGANIC COMPOUNDS

This is an application filed under 35 USC 371 based on PCT/EP2021/051458, filed 22,Jan. 2021 which claimed priority to GB 2014639.5 filed 17.Sep.2020. The present application claims the full priority benefit of all prior applications and incorporates by reference their full disclosures as if set forth herein.

The present invention relates to a fragrance accord, to a use of such a fragrance accord for enhancing the bloom linearity of a fragrance composition, and to a method for enhancing the bloom linearity of a fragrance composition.

One sought after benefit of perfumed products is the generation of a nice odor that increases the comfort of the user and leads to an olfactive cue related to the product efficacy. In fabric laundry, this traditionally translates to the generation of a powerful blooming odor on wet fabrics, combined with long lasting odor on dry fabrics. Both blooming and long lasting odors have the additional advantage of signalizing freshness and cleanness of the freshly washed fabrics. Today consumers are however increasingly keen to experience improved benefits with perfumed products. The capability of consumer products to generate odors that fill the room where a product is applied is becoming a key performance indicator conditioning product repurchasing. In fabric care, room filling enhances the action of the perfumed product during the line drying stage and reinforce the perception of cleanness and hygiene in the room where the fabric is let to dry.

In particular, it is highly desirable that room filling during line drying is perceived by the consumers as a continuation of the fresh and clean impression he/she has experienced when getting the laundry out of the wash machine. In other words, it is highly desirable that the fragrance composition employed to perfume the fabric care product is capable of providing an "extended" (or "linear") bloom that preferably lasts as long as the fabric is moist.

U.S. Pat. No. 9,885,009 B2 discloses a fabric conditioning composition comprising a mixture of microcapsules having different release profiles that significantly increase the perfume perception during multiple stages of a laundry process. The microcapsules differ in properties due to their polymer walls having been made using the same polymer and different cure temperatures, curing times, or a combination thereof. Such an approach requires the use of microcapsules to achieve the desired perception profile.

WO 2018/071897 A1 discloses high performing, high impact bloom accords containing fragrance ingredients having pre-defined experimental velocities. The experimental velocity is calculated as the distance the fragrance travels divided by the so-called speed of diffusivity. The disclosed composition rules are, however, not directed to delivering bloom linearity on fabrics.

Creating such linear fragrance bloom is difficult. Commercial products typically provide either a strong bloom that is perceived on the wet fabrics taken out of the wash machine on the cost of room filling during the drying stage, or vice versa. On the other hand, attempts to provide an optimal balance between bloom and room filling typically result in depressing both effects.

Furthermore, in order for the consumer to perceive bloom linearity, the fragrance intensity perceived during the drying stage should preferably be higher than the intensity perceived out of the machine. Under these conditions, the consumer is less prone to fatigue or habituation that otherwise could occur under real life conditions.

It is therefore a problem underlying the present invention to address the above-mentioned shortcomings in the prior art. In particular, it is a problem underlying the present invention to provide fragrance compositions for fabric care products that offer linear bloom that starts at the moment where the fabric is taken out of the wash machine and is perceived as room-filling during the line drying stage, and are hedonically pleasant to the consumer all over the time the product is applied and perceived.

This problem is solved by the subject-matter of the independent claims.

In a first aspect, the present invention provides a fragrance accord consisting of:

a) From 70 to 92 wt.-%, preferably from 85 to 91 wt.-%, of at least two fragrance ingredients selected from the group consisting of 2-cyclohexylidene-2-phenylacetonitrile (Peonile); 2-cyclohexylidene-2-(o-tolyl)acetonitrile (Petalia); (E)-3,7-dimethylnona-1,6-dien-3-ol (Ethyl Linalool); 3-(4-(tert-butyl)phenyl)-2-methylpropanal (Lilial); 3-(4-(2-methylpropyl)-2-methylphenyl) propanal (Nympheal); 3-methylbut-2-en-1-yl acetate (Prenyl Acetate); 1-(2,3,8,8-tetramethyl-1,2,3,4,5,6,7, 8-octahydronaphthalen-2-yl)ethanone (Sylvamber); (E)-4-methyldec-3-en-5-ol (Undecavertol); (1s,4s)-1,3, 3-trimethyl-2-oxabicyclo[2.2.2]octane (Eucalyptol); (4Z)-hept-4-en-2-yl 2-hydroxybenzoate (Karmaflor); 6-methoxy-2,6-dimethyloctanal (Calypsone); *Eucalyptus Globulus* Oil and Patchouli Oilreferred to as Group A fragrance ingredients;

b) From 5 to 29.5 wt.-%, preferably from 8 to 12 wt.-%, of at least two fragrance ingredients selected from the group consisting of 4-methyl-2-phenyl-3,6-dihydro-2H-pyran (Rosyrane); (Z)-hex-3-en-1-yl methyl carbonate (Liffarome); 2-methoxynaphtalene (Yara Yara); 1-methyl-2-(5-methylhex-4-en-2-yl)cyclopropylmethanol (Rosyfolia); 1-(2,6,6-trimethyl-1-cyclohex-3-enyl)but-2-en-1-one (Damascone Delta); methyl 2,4-dihydroxy-3,6-dimethylbenzoate (Evernyl); 3-ethoxy-4-hydroxybenzaldehyde (Ethyl Vanillin); 2,2,2-trichloro-1-phenylethyl acetate (Rosacetol); (Z)-3-methylcyclotetradec-5-enone (Cosmone); 1,3,4,5,6,7-hexahydro-β-1,1,5,5-pentamethyl-2H-2,4a-methanonaphthalene-8-ethanol (Ambermax); 2-ethoxy-4-(methoxymethyl)phenol (Methyl Diantilis); (1-methyl-2-((1,2,2-trimethylbicyclo[3.1.0]hexan-3-yl)methyl)-cyclopropyl)methanol (Javanol); (E)-2-ethyl-4-(2,2,3-trimethylcyclopent-3-en-1-yl)but-2-en-1-ol (Radjanol) and (2E,5E)-5,6,7-trimethylocta-2,5-dien-4-one (Pomarose), referred to as Group B fragrance ingredients; and c) From 0.5 to 3 wt.-%, preferably from 0.9 to 1.5 wt.-%, of at least one fragrance ingredient selected from the group consisting of decahydro-2,2,6,6,7,8,8-heptamethyl indenofuran (Amber Xtrem); (2-methoxyethyl) benzene (Pandanol); 2-methyl-4-propyl-1,3-oxathiane (Oxane); 2-(2,4-dimethylcyclohexyl)pyridine (Zinarine); ethyl cyclohexyl carboxylate (Esterly); (2E, 6Z)-nona-2,6-dienenitrile (Violet Nitrile); (E)-dec-4-enal (Decenal-4-Trans); (Z)-dec-4-enal (Decenal-4-Cis); (Z)-non-6-enal (Nonenal-6-Cis); 5-tert-butyl-2-methyl-5-propyl-2H-furan (Cassyrane); 1-(5,5-dimethylcyclohex-1-en-1-yl)pent-4-en-1-one (Galbanone Pure); 1-methoxy-7,9-dimethyl-2-oxaspiro [5.5]undec-8-ene (Ebelia); 2,4-dimethyl-4-phenyltetrahydrofuran (Rhubafuran) and 2,4,7-trimethyloct-6-en-1-ol (Pomelol), referred to as Group C fragrance ingredients.

When added to a consumer product, especially a laundry care product, fragrance accords fulfilling the aforementioned composition rules show enhanced bloom intensity and room filling intensity, as well as optimal balance between these two effects.

In the context of the present invention, the bloom intensity is assessed immediately on opening the window of a wash machine and at a distance of from 0.5 to 2 meters from the window.

The room filling intensity is assessed at a certain time, for example between 15 and 60 minutes, after the fabric has been put to line drying, at a distance of from 0.5 to 2 meters from the line.

Preferably, both bloom intensity and room filling intensity are assessed according to the standardized procedures described herein below in Example 3.

More particularly, the fragrance accords according to the present invention enhance the bloom linearity of fragrances on fabrics. This means that not only the perceived bloom and room filling intensities are enhanced, but also the difference in perceived intensity between these two intensities is maintained and even increased. Under these circumstances, the consumer experiences less fatigue or habituation as is the case with conventional products. Such benefit is surprising, as it cannot be straightforwardly inferred from the vapor pressure, the odor detection threshold or the odor value (OV) (i.e. the ratio of the volatility or equilibrium headspace concentration to the odor detection threshold) of the selected ingredients. Hence, for example, Galaxolide and Peonile have a similar volatility of 1 to 2 µg/l at 25° C. and both a log OV value of 3.6. However, it was found that Peonile was 7.6 times more performing in bloom intensity and 5.2 times more performing in room filling than Galaxolide. Similarly, whereas Rosyrane as a slightly higher volatility (170 µg/l) than Methyl Anthranilate (100 µg/l) at 25° C. and both have a similar log OV of 6.2 and 5.9, respectively, Rosyrane was found to perform 7 times more than Methyl Anthranilate in bloom intensity and 3 times more performing in bloom intensity. Similarly, whereas Citronellol and Undecavertol have a similar volatility of 130 µg/l and 145 µg/l, and a log OV of 4.4 and 4.5, Undecavertol performs 4 times more than Citronellol in bloom intensity and 2 times more in room filling.

The term "volatility" refers to the equilibrium headspace concentration (HS), expressed in microgram/liter (µg/l). This is the concentration of an ingredient in the gas phase in equilibrium with the condensed form—that is solid or liquid form—of said ingredient at a temperature of 25° C. and at a pressure of 1 atmosphere (normal pressure). It can be measured by using any of the known quantitative headspace analysis techniques in the art. A suitable method is described, e.g., in Mueller and Lamparsky in Perfumes: Art, Science and Technology, Chapter 6 "The Measurement of Odors" at pages 176-179 (Elsevier 1991).

The equilibrium headspace concentration may be measured as follows: 500 mg of a test perfumery ingredient are added to a container which is then sealed. The container is incubated at constant 25° C. until the compound reaches equilibrium between the gas and the condensed phase. A defined volume of headspace (usually 0.5-1.0 liter) is trapped on a micro filter using poly(4-ethylstyrene-co-divinylbenzene) porous material, for example Porapak Q from Supelco, as sorbent. After extraction with an appropriate solvent (usually 30-100 microliters methyl tertiary butyl ether), an aliquot of the extract is analyzed by gas chromatography. The concentration in the original headspace can be calculated (in terms of µg/l) from the headspace volume sucked through the micro filter and the aliquot of the filtered extract injected into the gas chromatograph. The final headspace concentration value of the tested perfumery ingredient is obtained as the mean value of three independent measurements each. Further information on the technique hereinabove described may be found in the article of Etzweiler, F.; Senn E. and Neuner-Jehle N., Ber. Bunsen-Ges. Phys. Chem. 1984, 88, 578-583.

The term "odor detection threshold" (ODT) used herein above refers to the average concentration above which a perfume ingredient can be perceived by a panelist and can be measured by olfactometry, as described, for example in Mueller and Lamparsky in Perfumes: Art, Science and Technology, Chapter 6 "The Measurement of Odors" at pages 176-179 (Elsevier 1991).

The odor detection threshold (ODT) may be measured by using an olfactometer. The olfactometer functions on the principle of a linear dilution of an odorant in a carrier gas. The quantity of odorant displaced depends on its vapor pressure and the carrier gas flow. A constant flow of nitrogen, regulated by a flow regulator, carries the odorant from a sample container to a mixing chamber. There, the carrier gas-odor mixture is diluted with odorless air. From the mixing chamber one part of the diluted odorous air is allowed to flow via a fused silica capillary to the sniffing funnel. The flow rate through the capillary, which determines the dosage of odorous air from the mixing chamber into the sniffing funnel, depends on the opening the valve which can be regulated via PC from 1 to 256 ml in binary steps. The final dilution of the odorous air sample occurs in the glass funnel by flushing them permanently with odorless air at a flow rate of 8 L/min. Forced-choice triangle presentation is achieved by a special automated channel setting device where only one position of a switch the odorant delivering capillary enters in the sniffing funnel, whereas in two other positions the capillary is positioned outside the funnel and where the effluent is sucked away. After each trial the channel setting is changed automatically and in a random order. The concentration is calculated from the odorants vapor pressure and from the dilution ratios that were applied in the olfactometer, assuming that vapor pressure saturation is achieved in the sample generator. As a control the concentration is determined analytically by sampling a known volume from the capillary effluent into a headspace filter and by subsequent gas chromatographic quantitation of the odorant in the desorption solution.

Each panelist (panel of 15 persons) starts sniffing at the olfactometer at a concentration level at which he perceives the odorant at medium intensity. After three correct answers in three consecutive trials (or four correct answers of five trials) at the same level, stimulus concentration is decreased by a factor of two to the next lower level, and so on, until the panelist has reached his threshold level. The final threshold value of a given odorant is obtained as the mean value of all individual threshold levels.

The aforementioned ingredients may be combined by the skilled perfumer in order to achieve the proper hedonic effect, such as desired odor directions and hedonics.

In particular embodiments, the fragrance accord according to the present invention is a fruity fragrance accord consisting of:

a) From 70 to 92 wt.-%, preferably from 85 to 91 wt.-%, of at least two fragrance ingredients selected from the group consisting of 2-cyclohexylidene-2-phenylacetonitrile (Peonile); (E)-3,7-dimethylnona-1,6-dien-3-ol (Ethyl Linalool); 3-(4-(tert-butyl)phenyl)-2-methylpropanal (Lilial); 3-(4-(2-methylpropyl)-2- methylphenyl)propanal (Nympheal); 3-methylbut-2-en-1-yl acetate (Prenyl Acetate); (4Z)-hept-4-en-2-yl 2-hydroxybenzoate (Karmaflor) and 6-methoxy-2,6-dimethyloctanal (Calypsone), referred to as Group A' fragrance ingredients;
b) From 5 to 29.5 wt.-%, preferably from 8 to 12 wt.-%, of at least two fragrance ingredients selected from the group consisting of 2-methoxynaphtalene (Yara Yara); 1-methyl-2-(5-methylhex-4-en-2-yl)cyclopropylmethanol (Rosyfolia); 1-(2,6,6-trimethyl-1-cyclohex-3-enyl)but-2-en-1-one (Damascone Delta); methyl 2,4-dihydroxy-3,6-dimethylbenzoate (Evernyl); 3-ethoxy-4-hydroxybenzaldehyde (Ethyl Vanillin) and (2E,5E)-5,6,7-trimethylocta-2,5-dien-4-one (Pomarose), referred to as Group B' ingredients; and
c) From 0.5 to 3 wt.-%, preferably from 0.9 to 1.5 wt.-%, of at least one fragrance ingredient selected from the group consisting of (2-methoxyethyl)benzene (Pandanol); 2-methyl-4-propyl-1,3-oxathiane (Oxane); (Z)-non-6-enal (Nonenal-6-Cis); ethyl cyclohexyl carboxylate (Esterly); (2E,6Z)-nona-2,6-dienenitrile (Violet Nitrile); (E)-dec-4-enal (Decenal-4-Trans); (Z)-dec-4-enal (Decenal-4-Cis); 5-tert-butyl-2-methyl-5-propyl-2H-furan (Cassyrane); 1-(5,5-dimethylcyclohex-1-en-1-yl)pent-4-en-1-one (Galbanone Pure); 1-methoxy-7,9-dimethyl-2-oxaspiro[5.5]undec-8-ene (Ebelia); 2,4-dimethyl-4-phenyltetrahydrofuran (Rhubafuran) and 2,4,7-trimethyloct-6-en-1-ol (Pomelol), referred to as Group C' ingredients.

In particular embodiments, the fragrance accord according to the present invention is a floral accord consisting of:
a) From 70 to 92 wt.-%, preferably from 85 to 91 wt.-%, of at least two fragrance ingredients selected from the group consisting of 2-cyclohexylidene-2-phenylacetonitrile (Peonile); 2-cyclohexylidene-2-(o-tolyl)acetonitrile (Petalia); 3-(4-(tert-butyl)phenyl)-2-methylpropanal (Lilial); 3-(4-(2-methylpropyl)-2-methylphenyl)propanal (Nympheal); (4Z)-hept-4-en-2-yl 2-hydroxybenzoate (Karmaflor); 6-methoxy-2,6-dimethyloctanal (Calypsone) and Patchouli oil, referred to as Group A' ingredients;
b) From 5 to 29.5 wt.-%, preferably from 8 to 12 wt.-%, of at least two fragrance ingredients selected from the group consisting of 4-methyl-2-phenyl-3,6-dihydro-2H-pyran (Rosyrane); 1-methyl-2-(5-methylhex-4-en-2-yl)cyclopropylmethanol (Rosyfolia); 2,2,2-trichloro-1-phenylethyl acetate (Rosacetol); (1-methyl-2-((1,2,2-trimethylbicyclo[3.1.0]hexan-3-yl)methyl) cyclopropyl)methanol (Javanol); (E)-2-ethyl-4-(2,2,3-trimethylcyclopent-3-en-1-yl)but-2-en-1-ol (Radjanol) and (2E,5E)-5,6,7-trimethylocta-2,5-dien-4-one (Pomarose), referred to as Group B" ingredients; and
c) From 0.5 to 3 wt.-%, preferably from 0.9 to 1.5 wt.-%, of at least one fragrance ingredient selected from the group consisting of decahydro-2,2,6,6,7,8,8-heptamethyl indenofuran (Amber Xtrem); (2E,6Z)-nona-2,6-dienenitrile (Violet Nitrile); 5-tert-butyl-2-methyl-5-propyl-2H-furan (Cassyrane); 2-(2,4-dimethylcyclohexyl)pyridine (Zinarine); 1-(5,5-dimethylcyclohex-1-en-1-yl)pent-4-en-1-one (Galbanone Pure); (Z)-non-6-enal (Nonenal-6-Cis); 2,4-dimethyl-4-phenyltetrahydrofuran (Rhubafuran) and 2,4,7-trimethyloct-6-en-1-ol (Pomelol), referred to as Group C" fragrance ingredients.

In particular embodiments, the fragrance accord according to the present invention is a citrus fragrance accord consisting of:

a) From 70 to 92 wt.-%, preferably from 85 to 91 wt.-%, of at least two fragrance ingredients selected from the group consisting of 2-cyclohexylidene-2-(o-tolyl)acetonitrile (Petalia); 3-methylbut-2-en-1-yl acetate (Prenyl Acetate); (4Z)-hept-4-en-2-yl 2-hydroxybenzoate (Karmaflor) and 6-methoxy-2,6-dimethyloctanal (Calypsone), referred to as Group A''' ingredients;
b) From 5 to 29.5 wt.-%, preferably from 8 to 12 wt.-%, of at least two fragrance ingredients selected from the group consisting of (Z)-hex-3-en-1-yl methyl carbonate (Liffarome); 2-methoxynaphtalene (Yara Yara) and 1-(2,6,6-trimethyl-1-cyclohex-3-enyl)but-2-en-1-one (Damascone Delta), referred to as Group B''' ingredients; and
c) From 0.5 to 3 wt.-%, preferably from 0.9 to 1.5 wt.-%, of at least one fragrance ingredient selected from the group consisting of (Z)-non-6-enal (Nonenal-6-Cis); ethyl cyclohexyl carboxylate (Esterly); (E)-dec-4-enal (Decenal-4-Trans); (Z)-dec-4-enal (Decenal-4-Cis) and 2,4,7-trimethyloct-6-en-1-ol (Pomelol), referred to as Group C''' ingredients.

In particular embodiments, the fragrance accord according to the present invention is a clean, green and aromatic fragrance accord consisting of:
a) From 70 to 92 wt.-%, preferably from 85 to 91 wt.-%, of at least two fragrance ingredients selected from the group consisting of (E)-3,7-dimethylnona-1,6-dien-3-ol (Ethyl Linalool); 3-(4-(tert-butyl)phenyl)-2-methylpropanal (Lilial); 3-(4-(2-methylpropyl)-2-methylphenyl)propanal (Nympheal); 1-(2,3,8,8-tetramethyl-1,2,3,4,5,6,7,8-octahydronaphthalen-2-yl)ethanone (Sylvamber); (E)-4-methyldec-3-en-5-ol (Undecavertol); (1s,4s)-1,3,3-trimethyl-2-oxabicyclo[2.2.2]octane (Eucalyptol); (4Z)-hept-4-en-2-yl 2-hydroxybenzoate (Karmaflor); 6-methoxy-2,6-dimethyloctanal (Calypsone) and *Eucalyptus Globulus* oil, referred to as Group A''' ingredients;
b) From 5 to 29.5 wt.-%, preferably from 8 to 12 wt.-%, of at least two fragrance ingredients selected from the group consisting of 1-(2,6,6-trimethyl-1-cyclohex-3-enyl)but-2-en-1-one (Damascone Delta); 1,3,4,5,6,7-hexahydro-β-1,1,5,5-pentamethyl-2H-2,4a-methanonaphthalene-8-ethanol (Ambermax) and (E)-2-ethyl-4-(2,2,3-trimethylcyclopent-3-en-1-yl)but-2-en-1-ol (Radjanol), referred to as Group B''' ingredients; and
c) From 0.5 to 3 wt.-%, preferably from 0.9 to 1.5 wt.-%, of at least one fragrance ingredient selected from the group consisting of 2-methyl-4-propyl-1,3-oxathiane (Oxane); 1-(5,5-dimethylcyclohex-1-en-1-yl)pent-4-en-1-one (Galbanone Pure); 1-methoxy-7,9-dimethyl-2-oxaspiro[5.5]undec-8-ene (Ebelia) and 2,4-dimethyl-4-phenyltetrahydrofuran (Rhubafuran), referred to as Group C''' ingredients.

The fragrance accords defined hereinabove may be employed as such or admixed with other fragrance ingredients or with any pre-existing fragrance compositions, conferring such pre-existing fragrance compositions enhanced bloom, room filling and bloom linearity.

Preferably fragrance accords according to the present invention are admixed with fragrance ingredients that are different from those employed in the fragrance accords, providing an original fragrance composition having enhanced bloom, room filling and bloom linearity.

Hence, the present invention provides a fragrance composition comprising:

a) From 1 to 30 wt.-%, preferably 5 to 25 wt.-%, of a fragrance accord according to the present invention; and b) From 70 to 99 wt.-%, preferably 75 to 95 wt.-%, of at least one other fragrance ingredient, wherein the at least one other fragrance ingredient is different from those employed in the fragrance accord according to the present invention.

The list of the other fragrance ingredients is not limitative and any fragrance ingredients that is available in the perfumer's palette of ingredients that is different from the ingredients employed in the fragrance accord may be used. A comprehensive list of fragrance ingredients that may be used in accordance with the present invention may be found in the perfumery literature, for example "Perfume & Flavor Chemicals", S.

Arctander (Allured Publishing, 1994), or on the Internet, for example http://www.thegoodscentscompany.com/ (consulted on Aug. 17, 2020). Perfume ingredients that are particularly suitable in laundry care applications comprise (2-(1-ethoxyethoxy)ethyl)benzene (Acetal E); ethyl 3-oxobutanoate (Ethyl Acetoacetate); 2-(tert-butyl)cyclohexyl acetate (Agrumex); decanal (Aldehyde C 10 Decylic); undec-10-enal (Aldehyde C 11 Undecylenic); undecanal (Aldehyde C 110 Undecylic); dodecanal (Aldehyde C 12 Lauric); 2-methylundecanal (Aldehyde C 12 MNA Pure); octanal (Aldehyde C 8 Octylic); (E)-undec-9-enal (Aldehyde Iso C 11); prop-2-enyl 2-(3-methylbutoxy)acetate (Allyl Amyl Glycolate); prop-2-enyl hexanoate (Allyl Caproate); prop-2-enyl 3-cyclohexylpropanoate (Allyl Cyclohexyl Propionate); prop-2-enyl heptanoate (Allyl Oenanthate); 3,8,8,11a-tetramethyldodecahydro-1H-3,5a-epoxynaphtho[2,1-c]oxepine (Amberketal); (Z)-oxacycloheptadec-10-en-2-one (Ambrettolide); (3aR,5aS,9aS,9bR)-3a,6,6,9a-tetramethyl-2,4,5,5a,7,8,9,9b-octahydro-1H-benzo[e][1]benzofuran (Ambrofix); pentyl 2-hydroxybenzoate (Amyl Salicylate); 1-phenylethanethiol (Anjeruk); 4-methoxybenzaldehyde (Aubepine Para Cresol); (E)-methyl 2-((7-hydroxy-3,7-dimethyloctylidene)amino)benzoate (Aurantiol); 7-isopentyl-2H-benzo[b][1,4]dioxepin-3(4H)-one (Azurone); benzyl acetate (Benzyl Acetate); 4-phenylbutan-2-one (Benzyl Acetone); benzyl 2-hydroxybenzoate (Benzyl Salicylate); 8-(sec-butyl)-5,6,7,8-tetrahydroquinoline (Bigaryl); (1S,2S,4S)-1,7,7-trimethylbicyclo[2.2.1]heptan-2-ol (Borneol Crystals); (2S,4S)-1,7,7-trimethylbicyclo[2.2.1]heptan-2-yl acetate (Bornyl Acetate); 1,4-dioxacycloheptadecane-5,17-dione (Ethylene Brassylate); 4-(tert-butyl)cyclohexyl acetate (Butyl Cyclohexyl Acetate Para); 8-methyl-1,5-benzodioxepin-3-one (Calone); (1S,4S)-1,7,7-trimethylbicyclo[2.2.1]heptan-2-one (Camphor Synthetic); (5R)-2-methyl-5-prop-1-en-2-yl-cyclohex-2-en-1-one (Carvone Laevo); 1,1,2,3,3-pentamethyl-2,3,6,7-tetrahydro-1H-inden-4(5H)-one (Cashmeran); (E)-3,7-dimethylocta-2,6-dienal (Citral Tech); 3,7-dimethyloct-6-en-1-ol (Citronellol Extra); 3,7-dimethyloct-6-en-1-yl acetate (Citronellyl Acetate); 3,7-dimethyloct-6-enenitrile (Citronellyl Nitrile); dodecanenitrile (Clonal); 2H-chromen-2-one (Coumarin); 1-methoxy-4-methylbenzene (Cresyl Methyl Ether Para); 2,4-dimethylcyclohex-3-ene-1-carbaldehyde (Cyclal C); 3-(4-isopropylphenyl)-2-methylpropanal (Cyclamen Aldehyde); (E)-1-(2,6,6-trimethylcyclohexa-1,3-dien-1-yl)but-2-en-1-one (Damascenone); 5-hexyloxolan-2-one (Decalactone Gamma); 2,6-dimethyloct-7-en-2-ol (Dihydro Myrcenol); 2-methyl-1-phenylpropan-2-ol acetate (Dimethyl Benzyl Carbinyl Acetate); 2,6-dimethylheptan-2-ol (Dimetol); oxydibenzene (Diphenyl Oxide); (E)-4-((3aS,7aS)-hexahydro-1H-4,7-methanoinden-5(6H)-ylidene)butanal (Dupical); (E)-3-methyl-5-(2,2,3-trimethylcyclopent-3-en-1-yl)pent-4-en-2-ol (Ebanol); ethyl butanoate (Ethyl Butyrate); 2-ethyl-3-hydroxy-4H-pyran-4-one (Ethyl Maltol); ethyl 2-methylbutanoate (Ethyl Methyl-2-Butyrate); 4-allyl-2-methoxyphenol (Eugenol Pure); 3-(4-ethylphenyl)-2,2-dimethylpropanal (Floralozone); 3-(3-isopropylphenyl)butanal (Florhydral); (3aR,6S,7aS)-3a,4,5,6,7,7a-hexahydro-1H-4,7-methanoinden-6-yl propanoate (Florocyclene); (Z)-1-(cyclooct-3-en-1-yl)propan-1-ol (Florymoss); ethyl methyl phenyl glycidate (Strawberry Pure); 2-(sec-butyl)cyclohexanone (Freskomenthe); 4,6,6,7,8,8-hexamethyl-1,3,4,6,7,8-hexahydrocyclopenta[g]isochromene (Galaxolide); 1-phenylethyl acetate (Gardenol); (E)-3,7-dimethylocta-2,6-dien-1-ol (Geraniol); (E)-3,7-dimethylocta-2,6-dien-1-yl acetate (Geranyl Acetate); (E)-oxacyclohexadec-12-en-2-one (Habanolide); methyl 3-oxo-2-pentylcyclopentaneacetate (Hedione); benzo[d][1,3]dioxole-5-carbaldehyde (Heliotropine); (Z)-hex-3-en-1-ol (Hexenol-3-Cis); (Z)-hex-3-en-1-yl acetate (Hexenyl-3-Cis Acetate); hexyl acetate (Hexyl Acetate); (E)-2-benzylideneoctanal (Hexyl Cinnamic Aldehyde); hexyl 2-hydroxybenzoate (Hexyl Salicylate); 1H-indole (Indole Pure); (E)-4-(2,6,6-trimethylcyclohex-1-en-1-yl)but-3-en-2-one (Ionone Beta); 3-methylbutyl acetate (Isoamyl Acetate); (E)-2-methoxy-4-(prop-1-en-1-yl)phenol (Isoeugenol); 2-isopropyl-5-methylcyclohexanone (Isomenthone DL); (E)-3-methyl-4-(2,6,6-trimethylcyclohex-2-en-1-yl)but-3-en-2-one (Isoraldeine 70); (3aR,6S,7aS)-3a,4,5,6,7,7a-hexahydro-1H-4,7-methanoinden-6-yl acetate (Jasmacyclene); (3E,6E)-2,4,4,7-tetramethylnona-6,8-dien-3-one oxime (Labienoxime); (2E,6Z)-3,7-dimethylnona-2,6-dienenitrile (Lemonile); 3,7-dimethylocta-1,6-dien-3-ol (Linalool); 3,7-dimethylocta-1,6-dien-3-yl acetate (Linalyl Acetate); bicyclo[2.2.2]oct-5-ene-2-carboxaldehyde (Maceal); ethyl 2-methylpentanoate (Manzanate); 3-methyl-5-phenylpentan-1-ol (Mefrosol); 2,6-dimethylhept-5-enal (Melonal); 6-methoxy-2,6-dimethylheptanal (Methoxymelonal); methyl 2-aminobenzoate (Methyl Anthranilate Extra); methyl benzoate (Methyl Benzoate); methyl non-2-ynoate (Methyl Octyne Carbonate); methyl 2-hydroxybenzoate (Methyl Salicylate); 2-(2-(4-methylcyclohex-3-en-1-yl)propyl)cyclopentanone (Nectaryl); 1-(2-naphtalenyl)-ethanone (Oranger Crystals); 2-ethyl-N-methyl-N-(m-tolyl)butanamide (Paradisamide); 5-heptyldihydrofuran-2(3H)-one (Peach Pure); 2-phenylethyl acetate (Phenyl Ethyl Acetate); 2-phenylethanol (Phenyl Ethyl Alcohol); 5-pentyldihydrofuran-2(3H)-one (Prunolide); 6-(sec-butyl)quinoline (Pyralone); 4-(4-hydroxyphenyl)butan-2-one (Raspberry Ketone); dec-9-en-1-ol (Rosalva); 4-methyl-2-(2-methylprop-1-en-1-yl)tetrahydro-2H-pyran (Rose Oxide Co); 2,3,3-trimethyl-2,3-dihydro-1H-inden-1-one (Safraleine); 4-vinylcyclohex-1-enecarbaldehyde (Shisolia); 1-(spiro[4.5]dec-6-en-7-yl)pent-4-en-1-one (Spirogalbanone Pure); (E)-2-((3,5-dimethylhex-3-en-2-yl)oxy)-2-methylpropyl cyclopropanecarboxylate (Sylkolide); 2-(4-methylcyclohex-3-en-1-yl)propan-2-ol (Terpineol Pure); 1-methyl-4-(propan-2-ylidene)cyclohex-1-ene (Terpinolene); 2-(4-methyl-1-cyclohex-3-enyl)propan-2-yl acetate (Terpinyl Acetate); 3,7-dimethyloctan-3-ol (Tetrahydro Linalool); 2,6-dimethyloctan-2-ol (Tetrahydro Myrcenol); oxacyclohexadecan-2-one (Thibetolide); 1-(cyclopropylmethyl)-4-methoxybenzene (Toscanol); (3E,5Z)-undeca-1,3,5-triene (Undecatriene); 4-hydroxy-3-methoxybenzaldehyde (Vanillin).

The person skilled in the art will know how to combine any fragrance accord according to the present invention and any of the at least one other fragrance ingredients in order to obtain a fragrance composition having the desired odor directions and hedonics, combined with the desired bloom, room filling and enhanced bloom linearity.

In a second aspect, the present invention provides a use of a fragrance accord according to the present invention for enhancing the bloom linearity of a fragrance composition, in particular on fabrics. It has been found that substrates treated with fragrance compositions comprising a fragrance accord as defined hereinabove at aforementioned levels, show enhanced bloom and room filling intensities, as well as enhanced bloom linearity.

Accordingly, in a third aspect, the present invention provides a laundry care product comprising a fragrance composition according to the present invention. Suitable laundry care products comprise detergent powders, liquid detergents, liquid single dose detergents, fabric care conditioners (also referred to as softeners), fabric refreshers and scent-boosters.

In a particular embodiment, the laundry care product contains the fragrance composition at a level of 0.005 to 10 wt.-%, more preferably from 0.1 to 5 wt.-%, and still more preferably from 0.025 to 1 wt.-% of the consumer product.

Typically, laundry care products according to the present invention contain surfactants, such as anionic, cationic, amphoteric or non-ionic surfactants.

Furthermore, laundry care products according to the present invention may contain acids or bases.

The laundry care products concerned may also contain builders for reducing water hardness, such as phosphates, polyphosphates, polycarboxylates, sodium citrate, sodium carbonate, sodium silicate, sodium aluminosilicate (zeolite).

In many cases, the laundry care products are liquid and may contain further additives, such as solvents, fillers, texturing agents, such as thickener and rheological aids, distributing aids, anti-redeposition agents, preservative agents, deodorizing agents, cosmetic ingredients, and surface enhancing agents.

The laundry care products may also contain at least one solvent selected from water-soluble solvents, or water-insoluble, or partially water-soluble solvents.

The laundry care products may also contain at least one texturing agent and/or colloid stabilizer, selected from rheology modifiers, thickener, gel-forming agents, thixotropic agents, and dispersing agents.

The laundry care products may also contain at least one silicone, selected from, but not limited to dimethicone, poly(dimethylsiloxabedimethylsiloxane), amino-silicone, such as amodimethicone, trialkylammonium-silicone salts, ethoxylated silicones.

The laundry care products may also contain at least one fabric enhancing agent, selected from, but not limited to softening agents, optical brighteners and antistatic agents.

In a fourth aspect, the present invention provides method for enhancing the bloom linearity of a fragrance composition, in particular on fabrics, the method comprising the steps of:
  a) Providing a fragrance accord as described herein above;
  b) Providing at least one other fragrance ingredient that is different from the fragrance ingredients employed in fragrance accord provided in step a);
  c) Admixing 1 to 30 wt.-%, preferably 8 to 20 wt.-%, of the fragrance accord as described herein above with 70 to 99 wt.-%, preferably 80 to 92 wt.-%, of the at least one other fragrance ingredient, in order to obtain a fragrance composition.

The fragrance composition obtained by the method described provides enhanced bloom and room filling, as well as enhanced bloom linearity on fabrics treated with such fragrance composition.

In preferred embodiments, the method according to the present invention for enhancing the bloom linearity of a fragrance composition on fabrics additionally comprises the steps of:
  d) Adding 0.1 to 5 wt.-%, preferably 0.2 to 2.5 wt.-%, still more preferably 0.3 to 1 wt.-%, of the fragrance composition obtained in step c) into a fabric care product base, preferably laundry detergent, still more preferably a liquid laundry detergent, in order to obtain a perfumed fabric care product; and
  e) Treating a fabric with the perfumed fabric care product obtained in step d) by performing a wash or a rinse cycle.

Fabrics treated according to the method described hereinabove show enhanced bloom intensity, as perceived out of the wash machine, and room filling, as perceived during line drying, as well as enhanced bloom linearity between this two assessment stages.

The following combinations of features form part of the present disclosure:
  A. A fragrance accord consisting of:
    a) From 70 to 92 wt.-%, preferably from 85 to 91 wt.-%, of at least two fragrance ingredients selected from the group consisting of 2-cyclohexylidene-2-phenylacetonitrile; 2-cyclohexylidene-2-(o-tolyl)acetonitrile; (E)-3,7-dimethylnona-1,6-dien-3-ol; 3-(4-(tert-butyl)phenyl)-2-methylpropanal; 3-(4-(2-methylpropyl)-2-methylphenyl)-propanal; 3-methylbut-2-en-1-yl acetate; 1-(2,3,8,8-tetramethyl-1,2,3,4,5,6,7,8-octahydronaphthalen-2-yl)ethanone; (E)-4-methyldec-3-en-5-ol; (1s,4s)-1,3,3-trimethyl-2-oxabicyclo[2.2.2]octane; *Eucalyptus Globulus* Oil and Patchouli Oil, referred to as Group A fragrance ingredients;
    b) From 5 to 29.5 wt.-%, preferably from 8 to 12 wt.-%, of at least two fragrance ingredients selected from the group consisting of 4-methyl-2-phenyl-3,6-dihydro-2H-pyran; (Z)-hex-3-en-1-yl methyl carbonate; 2-methoxynaphtalene; 1-methyl-2-(5-methylhex-4-en-2-yl)cyclopropylmethanol; 1-(2,6,6-trimethyl-1-cyclohex-3-enyl)but-2-en-1-one; methyl 2,4-dihydroxy-3,6-dimethylbenzoate; 3-ethoxy-4-hydroxybenzaldehyde; 2,2,2-trichloro-1-phenylethyl acetate; (Z)-3-methylcyclotetradec-5-enone; 1,3,4,5,6,7-hexahydro-β-1,1,5,5-pentamethyl-2H-2,4a-methanonaphthalene-8-ethanol; 2-ethoxy-4-(methoxymethyl)phenol; (1-methyl-2-((1,2,2-trimethylbicyclo[3.1.0]-hexan-3-yl)methyl)-cyclopropyl)methanol and (E)-2-ethyl-4-(2,2,3-trimethylcyclopent-3-en-1-yl)but-2-en-1-ol, referred to as Group B fragrance ingredients; and
    c) From 0.5 to 3 wt.-%, preferably from 0.9 to 1.5 wt.-%, of at least one fragrance ingredient selected from the group consisting of decahydro-2,2,6,6,7,8,8-heptamethyl indenofuran; (2-methoxyethyl)benzene; 2-methyl-4-propyl-1,3-oxathiane; 2-(2,4-dimethylcyclohexyl)pyridine; ethyl cyclohexyl carboxylate; (2E,6Z)-nona-2,6-dienenitrile; (E)-dec-4-enal; (Z)-dec-4-enal; (Z)-non-6-enal; 5-tert-butyl-2-methyl-5-propyl-2H-furan; 1-(5,5-dimethylcyclohex-1-en-1-yl)pent-4-en-1-one; 1-methoxy-7,9-dimethyl-2-oxaspiro[5.5]undec-8-ene and 2,4-dimethyl-4-phenyltetrahydrofuran, referred to as Group C fragrance ingredients.

B. A fruity fragrance accord according to combination A, consisting of:
- a) From 70 to 92 wt.-%, preferably from 85 to 91 wt.-%, of at least two fragrance ingredients selected from the group consisting of 2-cyclohexylidene-2-phenylacetonitrile; (E)-3,7-dimethylnona-1,6-dien-3-ol; 3-(4-(tert-butyl)phenyl)-2-methylpropanal; 3-(4-(2-methylpropyl)-2-methylphenyl)propanal and 3-methylbut-2-en-1-yl acetate, referred to as Group A' fragrance ingredients;
- b) From 5 to 29.5 wt.-%, preferably from 8 to 12 wt.-%, of at least two fragrance ingredients selected from the group consisting of 2-methoxynaphtalene; 1-methyl-2-(5-methylhex-4-en-2-yl)cyclopropylmethanol; 1-(2,6,6-trimethyl-1-cyclohex-3-enyl)but-2-en-1-one; methyl 2,4-dihydroxy-3,6-dimethylbenzoate; and 3-ethoxy-4-hydroxybenzaldehyde, referred to as Group B' ingredients; and
- c) From 0.5 to 3 wt.-%, preferably from 0.9 to 1.5 wt.-%, of at least one fragrance ingredient selected from the group consisting of (2-methoxyethyl)benzene; 2-methyl-4-propyl-1,3-oxathiane; (Z)-non-6-enal; ethyl cyclohexyl carboxylate; (2E,6Z)-nona-2,6-dienenitrile; (E)-dec-4-enal; (Z)-dec-4-enal; 5-tert-butyl-2-methyl-5-propyl-2H-furan; 1-(5,5-dimethylcyclohex-1-en-1-yl)pent-4-en-1-one; 1-methoxy-7,9-dimethyl-2-oxaspiro[5.5]undec-8-ene and 2,4-dimethyl-4-phenyltetrahydrofuran, referred to as Group C' ingredients.

C. A floral fragrance accord according to combination A, consisting of:
- a) From 70 to 92 wt.-%, preferably from 85 to 91 wt.-%, of at least two fragrance ingredients selected from the group consisting of 2-cyclohexylidene-2-phenylacetonitrile; 2-cyclohexylidene-2-(o-tolyl)acetonitrile; 3-(4-(tert-butyl)phenyl)-2-methylpropanal; 3-(4-(2-methylpropyl)-2-methylphenyl)propanal and Patchouli oil, referred to as Group A'' ingredients;
- b) From 5 to 29.5 wt.-%, preferably from 8 to 12 wt.-%, of at least two fragrance ingredients selected from the group consisting of 4-methyl-2-phenyl-3,6-dihydro-2H-pyran; 1-methyl-2-(5-methylhex-4-en-2-yl)cyclopropylmethanol; 2,2,2-trichloro-1-phenylethyl acetate; (1-methyl-2-((1,2,2-trimethylbicyclo[3.1.0]hexan-3-yl)methyl)cyclopropyl)methanol and (E)-2-ethyl-4-(2,2,3-trimethylcyclopent-3-en-1-yl)but-2-en-1-ol, referred to as Group B'' ingredients; and
- c) From 0.5 to 3 wt.-%, preferably from 0.9 to 1.5 wt.-%, of at least one fragrance ingredient selected from the group consisting of decahydro-2,2,6,6,7,8,8-heptamethyl indenofuran; (2E,6Z)-nona-2,6-dienenitrile; 5-tert-butyl-2-methyl-5-propyl-2H-furan; 2-(2,4-dimethylcyclohexyl)-pyridine; 1-(5,5-dimethylcyclohex-1-en-1-yl)pent-4-en-1-one; (Z)-non-6-enal and 2,4-dimethyl-4-phenyltetrahydrofuran, referred to as Group C'' fragrance ingredients.

D. A citrus fragrance accord according to combination A, consisting of:
- a) From 70 to 92 wt.-%, preferably from 85 to 91 wt.-%, of at least two fragrance ingredients selected from the group consisting of 2-cyclohexylidene-2-(o-tolyl)acetonitrile and 3-methylbut-2-en-1-yl acetate, referred to as Group A''' ingredients;
- b) From 5 to 29.5 wt.-%, preferably from 8 to 12 wt.-%, of at least two fragrance ingredients selected from the group consisting of (Z)-hex-3-en-1-yl methyl carbonate; 2-methoxynaphtalene and 1-(2,6,6-trimethyl-1-cyclohex-3-enyl)but-2-en-1-one, referred to as Group B''' ingredients; and c) From 0.5 to 3 wt.-%, preferably from 0.9 to 1.5 wt.-%, of at least one fragrance ingredient selected from the group consisting of (Z)-non-6-enal; ethyl cyclohexyl carboxylate; (E)-dec-4-enal and (Z)-dec-4-enal, referred to as Group C''' ingredients.

E. A clean green and aromatic fragrance accord according to combination A, consisting of:
- a) From 70 to 92 wt.-%, preferably from 85 to 91 wt.-%, of at least two fragrance ingredients selected from the group consisting of (E)-3,7-dimethylnona-1,6-dien-3-ol; 3-(4-(tert-butyl)phenyl)-2-methylpropanal; 3-1R (4-(2-methylpropyl)-2-methylphenyl)propanal; 1-(2,3,8,8-tetramethyl-1,2,3,4,5,6,7,8-octahydronaphthalen-2-yl)ethanone; (E)-4-methyldec-3-en-5-ol; (1s,4s)-1,3,3-trimethyl-2-oxabicyclo[2.2.2]octane and *Eucalyptus Globulus* oil, referred to as Group A'''' ingredients;
- b) From 5 to 29.5 wt.-%, preferably from 8 to 12 wt.-%, of at least two fragrance ingredients selected from the group consisting of 1-(2,6,6-trimethyl-1-cyclohex-3-enyl)but-2-en-1-one; 1,3,4,5,6,7-hexahydro-β-1,1,5,5-pentamethyl-2H-2,4a-methanonaphthalene-8-ethanol and (E)-2-ethyl-4-(2,2,3-trimethylcyclopent-3-en-1-yl)but-2-en-1-ol, referred to as Group B'''' ingredients; and
- c) From 0.5 to 3 wt.-%, preferably from 0.9 to 1.5 wt.-%, of at least one fragrance ingredient selected from the group consisting of 2-methyl-4-propyl-1,3-oxathiane; 1-(5,5-dimethylcyclohex-1-en-1-yl)pent-4-en-1-one; 1-methoxy-7,9-dimethyl-2-oxaspiro[5.5]undec-8-ene and 2,4-dimethyl-4-phenyltetrahydrofuran, referred to as Group C'''' ingredients.

F. A fragrance composition comprising:
- a) From 1 to 30 wt.-%, preferably 5 to 25 wt.-%, of a fragrance accord according to one of combinations A to E; and
- b) From 70 to 99 wt.-%, preferably 75 to 95 wt.-%, of at least one other fragrance ingredient, wherein the at least one other fragrance ingredient is different from those employed in the fragrance accord according to one of combinations A to E.

G. A use of a fragrance accord according to one of combinations A to E for enhancing the bloom linearity of a fragrance composition, in particular on fabrics.

H. A laundry care product comprising a fragrance composition according to combination F.

I. A method for enhancing the bloom linearity of a fragrance composition, in particular on fabrics, the method comprising the steps of:
- a) Providing a fragrance accord according to one of combinations A to E;
- b) Providing at least one other fragrance ingredient that is different from the fragrance ingredients employed in fragrance accord;
- c) Admixing 1 to 30 wt.-%, preferably 8 to 20 wt.-%, of the fragrance accord according to one of combinations A to E with 70 to 99 wt.-%, preferably 80 to 92 wt.-%, of the at least one other fragrance ingredient, in order to obtain a fragrance composition.

J. The method according to combination I for enhancing the bloom linearity of a fragrance composition on fabrics, the method additionally comprising the steps of:
- d) Adding 0.1 to 5 wt.-%, preferably 0.2 to 2.5 wt.-%, still more preferably 0.3 to 1 wt.-%, of the fragrance composition obtained in step c) into a fabric care product base, preferably laundry detergent, still more preferably a liquid laundry detergent, in order to obtain a perfumed fabric care product; and
- e) Treating a fabric with the perfumed fabric care product obtained in step d) by performing a wash or a rinse cycle.

Particular features and further advantages of the present invention become apparent from the following examples.

EXAMPLE 1: FRAGRANCE ACCORDS ACCORDING TO THE PRESENT INVENTION

The fragrance accords of Table 1 were prepared by mixing the corresponding fragrance ingredients.

TABLE 1

Fragrance accords according to the present invention

| | 1.1 | 1.2 | 1.3 | 1.4 | 1.5 |
|---|---|---|---|---|---|
| 3-methylbut-2-en-1-yl acetate | 71.39 | | 5.90 | | |
| decahydro-2,2,6,6,7,8,8-heptamethyl indenofuran | | | 0.06 | | |
| 5-tert-butyl-2-methyl-5-propyl-2H-furan | | | | | |
| 1-(2,6,6-trimethyl-1-cyclohex-3-enyl)but-2-en-1-one | 12.00 | | 5.30 | | 4.50 |
| (E)-dec-4-enal | | 1.25 | | | |
| ethyl cyclohexyl carboxylate | 0.014 | | | 0.10 | |
| (E)-3,7-dimethylnona-1,6-dien-3-ol | | | 52.90 | | |
| 3-ethoxy-4-hydroxybenzaldehyde | | | | 4.00 | |
| Eucalyptus oil | | | | 45.00 | |
| methyl 2,4-dihydroxy-3,6-dimethylbenzoate | | | | | |
| 1-(5,5-dimethylcyclohex-1-en-1-yl)pent-4-en-1-one | 1.90 | | | | |
| (1-methyl-2-((1,2,2-trimethylbicyclo[3.1.0]hexan-3-yl)methyl)cyclopropyl)-methanol | | | | | |
| (Z)-hex-3-en-1-yl methyl carbonate | | | | | |
| 3-(4-(2-methylpropyl)-2-methylphenyl)propanal | | 20.00 | 11.66 | | 45.00 |
| (Z)-non-6-enal | | | 0.60 | | |
| 2-methyl-4-propyl-1,3-oxathiane | 0.70 | | | | |
| (2-methoxyethyl)benzene | | | 0.60 | 0.90 | 0.90 |
| Patchouli oil | | | | 46.00 | |
| 2-cyclohexylidene-2-phenylacetonitrile | | 41.15 | 11.76 | | 45.09 |
| 2-cyclohexylidene-2-(o-tolyl)acetonitrile | | 12.50 | 5.90 | | |
| (E)-2-ethyl-4-(2,2,3-trimethylcyclopent-3-en-1-yl)but-2-en-1-ol | | | | | |
| 2,4-dimethyl-4-phenyltetrahydrofuran | | | | | |
| 1-methyl-2-(5-methylhex-4-en-2-yl)cyclopropylmethanol | | 25.00 | 5.30 | | 4.50 |
| 4-methyl-2-phenyl-3,6-dihydro-2H-pyran | | | | 4.00 | |
| 1-(2,3,8,8-tetramethyl-1,2,3,4,5,6,7,8-octahydronaphthalen-2-yl)ethanone | | | | | |
| (E)-4-methyldec-3-en-5-ol | | | | | |
| (2E,6Z)-nona-2,6-dienenitrile | | 0.10 | 0.02 | | 0.01 |
| 2-methoxynaphtalene | 14.00 | | | | |
| 2-(2,4-dimethylcyclohexyl)-pyridine | | | | | |
| TOTAL | 100.00 | 100.00 | 100.00 | 100.00 | 100.00 |
| GROUP A | 71.39 | 73.65 | 88.12 | 91.00 | 90.09 |
| GROUP B | 26.00 | 25.00 | 10.60 | 8.00 | 9.00 |
| GROUP C | 2.61 | 1.35 | 1.28 | 1.00 | 0.91 |

| | 1.6 | 1.7 | 1.8 | 1.9 |
|---|---|---|---|---|
| 3-methylbut-2-en-1-yl acetate | | 45.10 | | |
| decahydro-2,2,6,6,7,8,8-heptamethyl indenofuran | | | | |
| 5-tert-butyl-2-methyl-5-propyl-2H-furan | 0.10 | | | |
| 1-(2,6,6-trimethyl-1-cyclohex-3-enyl)but-2-en-1-one | | | 5.50 | 4.45 |
| (E)-dec-4-enal | | | 0.90 | |
| ethyl cyclohexyl carboxylate | | | 0.001 | |
| (E)-3,7-dimethylnona-1,6-dien-3-ol | 45.00 | | | |
| 3-ethoxy-4-hydroxybenzaldehyde | | | | |
| Eucalyptus oil | | | | 41.00 |
| methyl 2,4-dihydroxy-3,6-dimethylbenzoate | 4.50 | | | |
| 1-(5,5-dimethylcyclohex-1-en-1-yl)pent-4-en-1-one | | | | 0.90 |
| (1-methyl-2-((1,2,2-trimethylbicyclo[3.1.0]hexan-3-yl)methyl)cyclopropyl)-methanol | | | 4.80 | |
| (Z)-hex-3-en-1-yl methyl carbonate | | 5.00 | | |
| 3-(4-(2-methylpropyl)-2-methylphenyl)propanal | 45.00 | | | |
| (Z)-non-6-enal | 0.90 | | | |
| 2-methyl-4-propyl-1,3-oxathiane | | | | 0.05 |
| (2-methoxyethyl)benzene | | | | |
| Patchouli oil | | | 50.00 | |
| 2-cyclohexylidene-2-phenylacetonitrile | | | | |
| 2-cyclohexylidene-2-(o-tolyl)acetonitrile | | 43.50 | | |
| (E)-2-ethyl-4-(2,2,3-trimethylcyclopent-3-en-1-yl)but-2-en-1-ol | | | | 4.60 |
| 2,4-dimethyl-4-phenyltetrahydrofuran | | | 0.90 | |
| 1-methyl-2-(5-methylhex-4-en-2-yl)cyclopropylmethanol | | | | |
| 4-methyl-2-phenyl-3,6-dihydro-2H-pyran | | | 4.20 | |
| 1-(2,3,8,8-tetramethyl-1,2,3,4,5,6,7,8-octahydronaphthalen-2-yl)ethanone | | | | 49.00 |
| (E)-4-methyldec-3-en-5-ol | | | 40.00 | |
| (2E,6Z)-nona-2,6-dienenitrile | | | | |
| 2-methoxynaphtalene | 4.50 | | | |
| 2-(2,4-dimethylcyclohexyl)-pyridine | | | 0.10 | |
| TOTAL | 100.00 | 100.00 | 100.00 | 100.00 |
| GROUP A | 90.00 | 88.60 | 90.00 | 90.00 |
| GROUP B | 9.00 | 10.50 | 9.00 | 9.05 |
| GROUP C | 1.00 | 0.901 | 1.00 | 0.95 |

EXAMPLE 2: FRAGRANCE COMPOSITIONS

A first series of fragrance compositions was prepared by admixing 10 wt.-% of fragrance accords according to Example 1 and 90 wt.-% of other ingredients that were different from the ingredients present in the fragrance accords. No fragrance accord was added in Example 2.0, which was taken as reference. These fragrance compositions are shown in Table 2.

TABLE 2

Fragrance compositions (Series 1)

| Fragrance accords | CAS number | 2.0 wt.-% | 2.1 wt.-% | 2.2 wt.-% |
|---|---|---|---|---|
| FRAGRANCE ACCORD 1.5 | | | 10.0 | |
| FRAGRANCE ACCORD 1.6 | | | | 10.0 |
| FRAGRANCE ACCORD 1.7 | | | | |
| FRAGRANCE ACCORD 1.8 | | | | |
| FRAGRANCE ACCORD 1.9 | | | | |
| Other fragrance ingredients | | | | |
| 2,6,10-trimethylundec-9-enal | 141-13-9 | 0.1 | 0.1 | 0.1 |
| 2-(tert-butyl)cyclohexyl acetate | 88-41-5 | 4.4 | 4.0 | 4.0 |
| decanal | 112-31-2 | 0.3 | 0.3 | 0.3 |
| undec-10-enal | 112-45-8 | 0.3 | 0.3 | 0.3 |
| dodecanal | 112-54-9 | 1.0 | 0.9 | 0.9 |
| 2-methylundecanal | 110-41-8 | 2.0 | 1.8 | 1.8 |
| (E)-undec-9-enal | 1337-83-3 | 0.2 | 0.2 | 0.2 |
| (E)-2-benzylideneoctanal | 101-86-0 | 0.2 | 0.2 | 0.2 |
| 1-(2,6,6-trimethyl-1-cyclohex-2-enyl)pent-1-en-3-one | 1335-46-2 | 3.1 | 2.8 | 2.8 |
| 1-((2-(tert-butyl)cyclohexyl)oxy)butan-2-ol | 139504-68-0 | 0.4 | 0.35 | 0.35 |
| (3aR,5aS,9aS,9bR)-3a,6,6,9a-tetramethyl-2,4,5,5a,7,8,9,9b-octahydro-1H-benzo[e][1]benzofuran | 6790-58-5 | 0.2 | 0.15 | 0.15 |
| (2S,4S)-1,7,7-trimethylbicyclo[2.2.1]heptan-2-yl acetate | 125-12-2 | 4.4 | 4.0 | 4.0 |
| 1,1,2,3,3-pentamethyl-2,3,6,7-tetrahydro-1H-inden-4(5H)-one | 33704-61-9 | 1.1 | 1.0 | 1.0 |
| 3,7-dimethyloct-6-en-1-ol | 106-22-9 | 5.6 | 5.0 | 5.0 |
| 3,7-dimethyloct-6-en-1-yl acetate | 150-84-5 | 0.2 | 0.2 | 0.2 |
| 2,4-dimethylcyclohex-3-ene-1-carbaldehyde | 68039-49-6 | 1.1 | 1.0 | 1.0 |
| 3-(4-isopropylphenyl)-2-methylpropanal | 103-95-7 | 4.4 | 4.0 | 4.0 |
| 2,6-dimethyloct-7-en-2-ol | 18479-58-8 | 23.3 | 21.0 | 21.0 |
| 2-methyl-1-phenylpropan-2-yl acetate | 151-05-3 | 0.1 | 0.1 | 0.1 |
| oxydibenzene | 101-84-8 | 0.6 | 0.5 | 0.5 |
| dipropylene glycol | 25265-71-8 | 1.4 | 1.3 | 1.3 |
| 3-(4-ethylphenyl)-2,2-dimethylpropanal | 67634-15-5 | 2.2 | 2.0 | 2.0 |
| 3-(3-isopropylphenyl)butanal | 125109-85-5 | 0.4 | 0.4 | 0.4 |
| 5-hexyloxolan-2-one | 706-14-9 | 0.9 | 0.8 | 0.8 |
| 1-phenylethyl acetate | 93-92-5 | 0.7 | 0.6 | 0.6 |
| (E)-3,7-dimethylocta-2,6-dien-1-ol | 106-24-1 | 5.6 | 5.0 | 5.0 |
| methyl 3-oxo-2-pentylcyclopentaneacetate | 24851-98-7 | 0.6 | 0.5 | 0.5 |
| hexyl acetate | 142-92-7 | 0.9 | 0.8 | 0.8 |
| hexyl 2-hydroxybenzoate | 6259-76-3 | 7.8 | 7.0 | 7.0 |
| 1-(2,3,8,8-tetramethyl-1,2,3,4,5,6,7,8-octahydronaphthalen-2-yl)ethanone | 54464-57-2 | 8.9 | 8.0 | 8.0 |
| (E)-2-methoxy-4-(prop-1-en-1-yl)phenol | 97-54-1 | 0.6 | 0.5 | 0.5 |
| (3aR,6S,7aS)-3a,4,5,6,7,7a-hexahydro-1H-4,7-methanoinden-6-yl acetate | 54830-99-8 | 7.6 | 6.8 | 6.8 |
| 3,7-dimethylocta-1,6-dien-3-ol | 78-70-6 | 6.1 | 5.5 | 5.5 |
| (4-isopropylcyclohexyl)methanol | 13828-37-0 | 0.6 | 0.5 | 0.5 |
| 2,6-dimethylhept-5-enal | 106-72-9 | 0.6 | 0.5 | 0.5 |
| methyl benzoate | 93-58-3 | 0.2 | 0.15 | 0.15 |
| 5-heptyldihydrofuran-2(3H)-one | 104-67-6 | 0.8 | 0.7 | 0.7 |
| 2-phenylethanol | 60-12-8 | 0.3 | 0.3 | 0.3 |
| 4-methyl-2-(2-methylprop-1-en-1-yl)tetrahydro-2H-pyran | 16409-43-1 | 0.3 | 0.3 | 0.3 |
| 1-methyl-4-(4-methylpentyl)cyclohex-3-enecarbaldehyde | 66327-54-6 | 0.3 | 0.25 | 0.25 |
| undec-10-enenitrile | 87731-18-8 | 0.2 | 0.2 | 0.2 |
| Total | | 100.0 | 100.0 | 100.0 |

| Fragrance accords | 2.3 wt.-% | 2.4 wt.-% | 2.5 wt.-% |
|---|---|---|---|
| FRAGRANCE ACCORD 1.5 | | | |
| FRAGRANCE ACCORD 1.6 | | | |
| FRAGRANCE ACCORD 1.7 | 10.0 | | |
| FRAGRANCE ACCORD 1.8 | | 10.0 | |
| FRAGRANCE ACCORD 1.9 | | | 10.0 |
| Other fragrance ingredients | | | |
| 2,6,10-trimethylundec-9-enal | 0.1 | 0.1 | 0.1 |
| 2-(tert-butyl)cyclohexyl acetate | 4.0 | 4.0 | 4.0 |
| decanal | 0.3 | 0.3 | 0.3 |
| undec-10-enal | 0.3 | 0.3 | 0.3 |
| dodecanal | 0.9 | 0.9 | 0.9 |
| 2-methylundecanal | 1.8 | 1.8 | 1.8 |
| (E)-undec-9-enal | 0.2 | 0.2 | 0.2 |

TABLE 2-continued

| Fragrance compositions (Series 1) | | | |
|---|---|---|---|
| (E)-2-benzylideneoctanal | 0.2 | 0.2 | 0.2 |
| 1-(2,6,6-trimethyl-1-cyclohex-2-enyl)pent-1-en-3-one | 2.8 | 2.8 | 2.8 |
| 1-((2-(tert-butyl)cyclohexyl)oxy)butan-2-ol | 0.35 | 0.35 | 0.35 |
| (3aR,5aS,9aS,9bR)-3a,6,6,9a-tetramethyl-2,4,5,5a,7,8,9,9b-octahydro-1H-benzo[e][1]benzofuran | 0.15 | 0.15 | 0.15 |
| (2S,4S)-1,7,7-trimethylbicyclo[2.2.1]heptan-2-yl acetate | 4.0 | 4.0 | 4.0 |
| 1,1,2,3,3-pentamethyl-2,3,6,7-tetrahydro-1H-inden-4(5H)-one | 1.0 | 1.0 | 1.0 |
| 3,7-dimethyloct-6-en-1-ol | 5.0 | 5.0 | 5.0 |
| 3,7-dimethyloct-6-en-1-yl acetate | 0.2 | 0.2 | 0.2 |
| 2,4-dimethylcyclohex-3-ene-1-carbaldehyde | 1.0 | 1.0 | 1.0 |
| 3-(4-isopropylphenyl)-2-methylpropanal | 4.0 | 4.0 | 4.0 |
| 2,6-dimethyloct-7-en-2-ol | 21.0 | 21.0 | 21.0 |
| 2-methyl-1-phenylpropan-2-yl acetate | 0.1 | 0.1 | 0.1 |
| oxydibenzene | 0.5 | 0.5 | 0.5 |
| dipropylene glycol | 1.3 | 1.3 | 1.3 |
| 3-(4-ethylphenyl)-2,2-dimethylpropanal | 2.0 | 2.0 | 2.0 |
| 3-(3-isopropylphenyl)butanal | 0.4 | 0.4 | 0.4 |
| 5-hexyloxolan-2-one | 0.8 | 0.8 | 0.8 |
| 1-phenylethyl acetate | 0.6 | 0.6 | 0.6 |
| (E)-3,7-dimethylocta-2,6-dien-1-ol | 5.0 | 5.0 | 5.0 |
| methyl 3-oxo-2-pentylcyclopentaneacetate | 0.5 | 0.5 | 0.5 |
| hexyl acetate | 0.8 | 0.8 | 0.8 |
| hexyl 2-hydroxybenzoate | 7.0 | 7.0 | 7.0 |
| 1-(2,3,8,8-tetramethyl-1,2,3,4,5,6,7,8-octahydronaphthalen-2-yl)ethanone | 8.0 | 8.0 | 8.0 |
| (E)-2-methoxy-4-(prop-1-en-1-yl)phenol | 0.5 | 0.5 | 0.5 |
| (3aR,6S,7aS)-3a,4,5,6,7,7a-hexahydro-1H-4,7-methanoinden-6-yl acetate | 6.8 | 6.8 | 6.8 |
| 3,7-dimethylocta-1,6-dien-3-ol | 5.5 | 5.5 | 5.5 |
| (4-isopropylcyclohexyl)methanol | 0.5 | 0.5 | 0.5 |
| 2,6-dimethylhept-5-enal | 0.5 | 0.5 | 0.5 |
| methyl benzoate | 0.15 | 0.15 | 0.15 |
| 5-heptyldihydrofuran-2(3H)-one | 0.7 | 0.7 | 0.7 |
| 2-phenylethanol | 0.3 | 0.3 | 0.3 |
| 4-methyl-2-(2-methylprop-1-en-1-yl)tetrahydro-2H-pyran | 0.3 | 0.3 | 0.3 |
| 1-methyl-4-(4-methylpentyl)cyclohex-3-enecarbaldehyde | 0.25 | 0.25 | 0.25 |
| undec-10-enenitrile | 0.2 | 0.2 | 0.2 |
| Total | 100.0 | 1000 | 100.0 |

A second series of compositions was prepared, wherein the other fragrance ingredients were replaced by reference fragrances A, B and C, selected from proprietary, conventional laundry detergent care fragrances (ex. Givaudan).

The fragrance compositions were prepared by mixing the reference fragrances and fragrance accords 1.4 and 1.5 of Example 1 at various levels. Examples 2.7, 2.9, 2.10, 2.12, 2.13, 2.15 and 2.16 are fragrance compositions according to the present invention and Example 2.6, 2.8, 2.11 and 2.14 are comparative examples.

TABLE 3

| Fragrance compositions (Series 2) | | | | | | | | | | | |
|---|---|---|---|---|---|---|---|---|---|---|---|
| Example | 2.6 | 2.7 | 2.8 | 2.9 | 2.10 | 2.11 | 2.12 | 2.13 | 2.14 | 2.15 | 2.16 |
| Fragrance accord 1.3 | | 14 | | | | | | | | | |
| Fragrance accord 1.4 | | | | 7 | 14 | | 7 | 14 | | 12 | 24 |
| Reference fragrance A | 100 | 86 | 100 | 93 | 86 | | | | | | |
| Reference fragrance B | | | | | | 100 | 93 | 86 | | | |
| Reference fragrance C | | | | | | | | | 100 | 88 | 76 |

EXAMPLE 3: WASHING AND OLFACTIVE EVALUATION PROCEDURES

The fragrances of Table 2 and 3, Examples 2.1 to 2.16, were admixed with a standard, unperfumed laundry care liquid detergent at a level of 0.32 wt.-% for Examples 2.1 to 2.5, 0.69 wt.-% for Examples 2.6 to 2.13 and 0.42 wt.-% for Examples 2.14 to 2.16. The mixtures were let to macerate for 3 days before further use. 35 ml of this detergent was used in a European front-loaded wash machine, loaded with 1.2 kg of cotton fabrics, consisting of three shirts, two terry toweling and two large bed sheets. The wash cycle was completed during 50 minutes at 40° C., followed by spin drying at 1000 rpm.

For the evaluation "out of the machine", the machine was disposed in a 10 m$^3$ booth with an air flow of 25 air exchanges per hour. The panelists were instructed to enter the booth in pairs and one panelist to open the machine door. The panelists stand back against the booth door and the intensity of the odor at this location was assessed at the moment the odor was first detected.

For the evaluation of the "room filling" intensity, the washed fabrics were immediately transferred to a line drying set-up disposed in the booth. The air exchange was stopped and the fabric let for drying for 30 minutes. The panelists were instructed to assess through the porthole of the booth.

For Examples 2.0 to 2.5, the olfactive evaluation was performed by a panel of 5 expert panelists.

The odor intensity was scored on a on a scale of 1-5 (1=barely noticeable, 2=weak, 3=medium, 4=strong and 5=very strong). Simultaneously, qualitative description of the odor was recorded. These results are reported on Table 4.

TABLE 4

Olfactive evaluation of sample 2.0 to 2.5 by expert panel

| | Out of the machine | | Line drying | |
|---|---|---|---|---|
| Sample | Strength | Odor quality | Strength | Odor quality |
| 2.0 | 3.8 | less intense, fruity melon floral | 3.8 | clean, hot iron, fruity orange flower |
| 2.1 | 4.1 | green fruity apple melon pineapple | 4.1 | fruity clean, in line with sample 2.0 character |
| 2.2 | 4 | clean fresh orange functional | 4.1 | good orange flower fruity, bit dry |
| 2.3 | 4.2 | Clean aldehydic soapy mandarin | 4.4 | aldehydic mandarin clean and fresh, sweet touch |
| 2.4 | 4.1 | rosy green bit metallic chypre effect | 4.3 | green rosyrane strong rose pathouli note, bit metallic |
| 2.5 | 4.3 | piny, easy to catch, bubble bath, intensity growing, clean | 4.5 | more piny, clean, very strong |

As apparent from Table 4, adding the fragrance accord according to the invention enhances both the strength of the odor at both out of the machine and drying stages, compared to reference 2.0, but also add positive attributes to the odor quality.

For Examples 2.6 to 2.16, the olfactive evaluation was performed by a panel of 25 trained, non-expert panelists. The evaluation protocol was the same as described hereinabove for examples 2.0 to 2.5, except the odor intensity was scored on a 100 unit scale for both the "out of the machine" and "room filling" assessments. The results are reported in Table 5. The "bloom linearity enhancement" factor is defined here as the difference between the perceived intensity during line drying and the perceived intensity on opening the machine.

TABLE 5

Odor intensity scores obtained by non-expert panelists

| Example | Olfactive score Out of the machine | Olfactive score Room filling | Bloom linearity enhancement |
|---|---|---|---|
| 2.6 (reference) | 28.4 | 34.4 | 6 |
| 2.7 | 32.1 | 38.5 | 6.6 |
| 2.8 (reference) | 28.4 | 34.4 | 6 |
| 2.9 | 34 | 46.3 | 12.3 |
| 2.10 | 36.1 | 46.6 | 10.5 |
| 2.11 (reference) | 30.7 | 37.5 | 6.8 |
| 2.12 | 32.1 | 44.3 | 12.2 |
| 2.13 | 38.6 | 50.5 | 11.9 |
| 2.14 (reference) | 29.6 | 36.8 | 7.2 |
| 2.15 | 36.4 | 49.3 | 12.9 |
| 2.16 | 38.3 | 52.4 | 14.1 |

As apparent from Table 5, adding a blooming accord according to the present invention on top of a conventional (reference) fragrance significantly enhances both the odor intensity of the bloom on opening the machine and during line drying. Furthermore, the bloom linearity of the new fragrance composition is either maintained (Example 2.2 vs. reference 2.1) or even enhanced (see Examples 2.4 and 2.5 vs. reference 2.3, Examples 2.7 and 2.8 vs. reference 2.6, and Examples 2.10 and 2.11 vs. reference 2.9).

The invention claimed is:

1. A fragrance accord consisting of:
 a) From 70 to 92 wt.-% of at least two fragrance ingredients selected from the group consisting of 2-cyclohexylidene-2-phenylacetonitrile; 2-cyclohexylidene-2-(o-tolyl)acetonitrile; (E)-3,7-dimethylnona-1,6-dien-3-ol; 3-(4-(tert-butyl)phenyl)-2-methylpropanal; 3-(4-(2-methylpropyl)-2-methylphenyl)-propanal; 3-methylbut-2-en-1-yl acetate; 1-(2,3,8,8-tetramethyl-1,2,3,4,5,6,7,8-octahydronaphthalen-2-yl)ethanone; (E)-4-methyldec-3-en-5-ol; (1s,4s)-1,3,3-trimethyl-2-oxabicyclo[2.2.2]octane; (4Z)-hept-4-en-2-yl 2-hydroxybenzoate; 6-methoxy-2,6-dimethyloctanal; *Eucalyptus Globulus* Oil and Patchouli Oil, referred to as Group A fragrance ingredients;
 b) From 5 to 29.5 wt.-% of at least two fragrance ingredients selected from the group consisting of 4-methyl-2-phenyl-3,6-dihydro-2H-pyran; (Z)-hex-3-en-1-yl methyl carbonate; 2-methoxynaphtalene; 1-methyl-2-(5-methylhex-4-en-2-yl)cyclopropylmethanol; 1-(2,6,6-trimethyl-1-cyclohex-3-enyl)but-2-en-1-one; methyl 2,4-dihydroxy-3,6-dimethylbenzoate; 3-ethoxy-4-hydroxybenzaldehyde; 2,2,2-trichloro-1-phenylethyl acetate; (Z)-3-methylcyclotetradec-5-enone; 1,3,4,5,6,7-hexahydro-β-1,1,5,5-pentamethyl-2H-2,4a-methanonaphthalene-8-ethanol; 2-ethoxy-4-(methoxymethyl)phenol; (1-methyl-2-((1,2,2-trimethylbicyclo[3.1.0]-hexan-3-yl)methyl)-cyclopropyl) methanol; (E)-2-ethyl-4-(2,2,3-trimethylcyclopent-3-en-1-yl)but-2-en-1-ol and (2E,5E)-5,6,7-trimethylocta-2,5-dien-4-one, referred to as Group B fragrance ingredients; and
 c) From 0.5 to 3 wt.-% of at least one fragrance ingredient selected from the group consisting of decahydro-2,2,6,6,7,8,8-heptamethyl indenofuran; (2-methoxyethyl) benzene; 2-methyl-4-propyl-1,3-oxathiane; 2-(2,4-dimethylcyclohexyl)pyridine; ethyl cyclohexyl carboxylate; (2E,6Z)-nona-2,6-dienenitrile; (E)-dec-4-enal; (Z)-dec-4-enal; (Z)-non-6-enal; 5-tert-butyl-2-methyl-5-propyl-2H-furan; 1-(5,5-dimethylcyclohex-1-en-1-yl)pent-4-en-1-one; 1-methoxy-7,9-dimethyl-2-oxaspiro[5.5]undec-8-ene; 2,4-dimethyl-4-phenyltetrahydrofuran and 2,4,7-trimethyloct-6-en-1-ol, referred to as Group C fragrance ingredients.

2. A fruity fragrance accord according to claim 1, consisting of:
 d) From 70 to 92 wt.-% of at least two fragrance ingredients selected from the group consisting of 2-cyclohexylidene-2-phenylacetonitrile; (E)-3,7-dimethylnona-1,6-dien-3-ol; 3-(4-(tert-butyl)phenyl)-2-methylpropanal; 3-(4-(2-methylpropyl)-2-methylphenyl)propanal; 3-methylbut-2-en-1-yl acetate; (4Z)-hept-4-en-2-yl 2-hydroxybenzoate and 6-methoxy-2,6-dimethyloctanal, referred to as Group A' fragrance ingredients;

e) From 5 to 29.5 wt.-% of at least two fragrance ingredients selected from the group consisting of 2-methoxynaphtalene; 1-methyl-2-(5-methylhex-4-en-2-yl)cyclopropylmethanol; 1-(2,6,6-trimethyl-1-cyclohex-3-enyl)but-2-en-1-one; methyl 2,4-dihydroxy-3,6-dimethylbenzoate; 3-ethoxy-4-hydroxybenzaldehyde and (2E,5E)-5,6,7-trimethylocta-2,5-dien-4-one, referred to as Group B' ingredients; and f) From 0.5 to 3 wt.-% of at least one fragrance ingredient selected from the group consisting of (2-methoxyethyl) benzene; 2-methyl-4-propyl-1,3-oxathiane; (Z)-non-6-enal; ethyl cyclohexyl carboxylate; (2E,6Z)-nona-2,6-dienenitrile; (E)-dec-4-enal; (Z)-dec-4-enal; 5-tert-butyl-2-methyl-5-propyl-2H-furan; 1-(5,5-dimethylcyclohex-1-en-1-yl)pent-4-en-1-one; 1-methoxy-7,9-dimethyl-2-oxaspiro[5.5]undec-8-ene; 2,4-dimethyl-4-phenyltetrahydrofuran and 2,4,7-trimethyloct-6-en-1-ol, referred to as Group C' ingredients.

3. A floral fragrance accord according to claim 1, consisting of:
g) From 70 to 92 wt.-% of at least two fragrance ingredients selected from the group consisting of 2-cyclohexylidene-2-phenylacetonitrile; 2-cyclohexylidene-2-(o-tolyl)acetonitrile; 3-(4-(tert-butyl)phenyl)-2-methylpropanal, 3-(4-(2-methylpropyl)-2-methylphenyl)propanal; (4Z)-hept-4-en-2-yl 2-hydroxybenzoate; 6-methoxy-2,6-dimethyloctanal and Patchouli oil, referred to as Group A' ingredients;
h) From 5 to 29.5 wt.-% of at least two fragrance ingredients selected from the group consisting of 4-methyl-2-phenyl-3,6-dihydro-2H-pyran; 1-methyl-2-(5-methylhex-4-en-2-yl)cyclopropylmethanol; 2,2,2-trichloro-1-phenylethyl acetate; (1-methyl-2-((1,2,2-trimethylbicyclo[3.1.0]hexan-3-yl)methyl)cyclopropyl)methanol; (E)-2-ethyl-4-(2,2,3-trimethylcyclopent-3-en-1-yl)but-2-en-1-ol and (2E, 5E)-5,6,7-trimethylocta-2,5-dien-4-one, referred to as Group B'' ingredients; and
i) From 0.5 to 3 wt.-% of at least one fragrance ingredient selected from the group consisting of decahydro-2,2,6,6,7,8,8-heptamethyl indenofuran; (2E,6Z)-nona-2,6-dienenitrile; 5-tert-butyl-2-methyl-5-propyl-2H-furan; 2-(2,4-dimethylcyclohexyl)-pyridine; 1-(5,5-dimethylcyclohex-1-en-1-yl)pent-4-en-1-one; (Z)-non-6-enal; 2,4-dimethyl-4-phenyltetrahydrofuran and 2,4,7-trimethyloct-6-en-1-ol, referred to as Group C'' fragrance ingredients.

4. A citrus fragrance accord according to claim 1, consisting of:
j) From 70 to 92 wt.-% of at least two fragrance ingredients selected from the group consisting of 2-cyclohexylidene-2-(o-tolyl)acetonitrile and 3-methylbut-2-en-1-yl acetate; (4Z)-hept-4-en-2-yl 2-hydroxybenzoate and 6-methoxy-2,6-dimethyloctanal, referred to as Group A''' ingredients;
k) From 5 to 29.5 wt. % of at least two fragrance ingredients selected from the group consisting of (Z)-hex-3-en-1-yl methyl carbonate; 2-methoxynaphtalene and 1-(2,6,6-trimethyl-1-cyclohex-3-enyl)but-2-en-1-one, referred to as Group B''' ingredients; and
l) From 0.5 to 3 wt.-% of at least one fragrance ingredient selected from the group consisting of (Z)-non-6-enal; ethyl cyclohexyl carboxylate; (E)-dec-4-enal and (Z)-dec-4-enal and 2,4,7-trimethyloct-6-en-1-ol, referred to as Group C''' ingredients.

5. A clean green and aromatic fragrance accord according to claim 1, consisting of:
m) From 70 to 92 wt.-% of at least two fragrance ingredients selected from the group consisting of (E)-3,7-dimethylnona-1,6-dien-3-ol; 3-(4-(tert-butyl)phenyl)-2-methylpropanal; 3-(4-(2-methylpropyl)-2-methylphenyl)propanal; 1-(2,3,8,8-tetramethyl-1,2,3,4,5,6,7,8-octahydronaphthalen-2-yl)ethanone; (E)-4-methyldec-3-en-5-ol; (1s,4s)-1,3,3-trimethyl-2-oxabicyclo[2.2.2]octane; (4Z)-hept-4-en-2-yl 2-hydroxybenzoate; 6-methoxy-2,6-dimethyloctanal and *Eucalyptus Globulus* oil, referred to as Group A''' ingredients;
n) From 5 to 29.5 wt.-% of at least two fragrance ingredients selected from the group consisting of 1-(2,6,6-trimethyl-1-cyclohex-3-enyl)but-2-en-1-one; 1,3,4,5,6,7-hexahydro-β-1,1,5,5-pentamethyl-2H-2,4a-methanonaphthalene-8-ethanol and (E)-2-ethyl-4-(2,2,3-trimethylcyclopent-3-en-1-yl)but-2-en-1-ol, referred to as Group B''' ingredients; and
o) From 0.5 to 3 wt.-% of at least one fragrance ingredient selected from the group consisting of 2-methyl-4-propyl-1,3-oxathiane; 1-(5,5-dimethylcyclohex-1-en-1-yl)pent-4-en-1-one; 1-methoxy-7,9-dimethyl-2-oxaspiro[5.5]undec-8-ene and 2,4-dimethyl-4-phenyltetrahydrofuran, referred to as Group C''' ingredients.

6. A fragrance composition comprising:
p) From 1 to 30 wt.-% of a fragrance accord according to one of claims 1 to 5; and
q) From 70 to 99 wt.-% of at least one other fragrance ingredient, wherein the at least one other fragrance ingredient is different from those employed in the fragrance accord according to one of claims 1 to 5.

7. A method of enhancing the bloom linearity of a fragrance composition, in particular on fabrics, comprising the step of: contacting a fragrance according to claim 1 with a fabric.

8. A laundry care product comprising a fragrance composition according to claim 6.

9. A method for enhancing the bloom linearity of a fragrance composition, in particular on fabrics, the method comprising the steps of:
r) Providing a fragrance accord according to claim 1;
s) Providing at least one other fragrance ingredient that is different from the fragrance ingredients employed in fragrance accord;
t) Admixing 1 to 30 wt.-% of the fragrance accord according to one of claims 1 to 5 with 70 to 99 wt.-% of the at least one other fragrance ingredient, in order to obtain a fragrance composition.

10. The method according to claim 9 for enhancing the bloom linearity of a fragrance composition on fabrics, the method additionally comprising the steps of:
d) Adding 0.1 to 5 wt.-% of the fragrance composition obtained in step c) into a fabric care product base in order to obtain a perfumed fabric care product; and
e) Treating a fabric with the perfumed fabric care product obtained in step d) by performing a wash or a rinse cycle.

* * * * *